United States Patent
Tanaka et al.

(10) Patent No.: US 12,319,512 B2
(45) Date of Patent: Jun. 3, 2025

(54) TRANSFER SYSTEM

(71) Applicant: DAIFUKU CO., LTD., Osaka (JP)

(72) Inventors: Syuji Tanaka, Osaka (JP); Tomokazu Mizuguchi, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 167 days.

(21) Appl. No.: 18/306,486

(22) Filed: Apr. 25, 2023

(65) Prior Publication Data

US 2023/0416008 A1 Dec. 28, 2023

(30) Foreign Application Priority Data

Jun. 14, 2022 (JP) .................................. 2022-095912

(51) Int. Cl.
*B65G 41/00* (2006.01)
*B65G 47/64* (2006.01)

(52) U.S. Cl.
CPC ......... *B65G 41/003* (2013.01); *B65G 47/642* (2013.01); *B65G 47/643* (2013.01); *B65G 2203/0283* (2013.01); *B65G 2207/20* (2013.01)

(58) Field of Classification Search
CPC .... B65G 21/14; B65G 41/003; B65G 47/642; B65G 47/643; B65G 2203/0283; B65G 2207/20
See application file for complete search history.

(56) References Cited

U.S. PATENT DOCUMENTS

| | | | | |
|---|---|---|---|---|
| 5,328,316 A | * | 7/1994 | Hoffmann | B65G 1/0435 414/280 |
| 7,275,635 B2 | * | 10/2007 | Enya | B65G 47/648 198/572 |
| 8,776,983 B2 | * | 7/2014 | Yang | B65G 47/642 198/412 |
| 10,518,978 B2 | * | 12/2019 | Vogt | B05B 13/0278 |
| 10,604,356 B2 | * | 3/2020 | Tanimoto | B65G 13/06 |
| 10,618,732 B2 | * | 4/2020 | Iwata | B65G 41/003 |
| 10,894,664 B1 | | 1/2021 | Brady et al. | |

FOREIGN PATENT DOCUMENTS

| | | |
|---|---|---|
| CN | 113682787 A | 11/2021 |
| JP | H10-279040 A | 10/1998 |
| JP | 2001-63803 A | 3/2001 |
| JP | 2001-69656 A | 3/2001 |

(Continued)

OTHER PUBLICATIONS

Japanese Office Action for Japanese Application No. 2022-095912 and English translation thereof mailed Jul. 2, 2024.

(Continued)

*Primary Examiner* — Gene O Crawford
*Assistant Examiner* — Keith R Campbell
(74) *Attorney, Agent, or Firm* — Harness, Dickey & Pierce, P.L.C.

(57) ABSTRACT

Provided is a transfer system including: a first conveyor, a second conveyor, a vertical position adjustment mechanism configured to adjust relative vertical positions of the first conveyor and the second conveyor; and a horizontal position adjustment mechanism configured to adjust, in a horizontal plane, relative positions of the first conveyor and the second conveyor in a direction orthogonal to a transfer direction.

9 Claims, 13 Drawing Sheets

(56) References Cited

FOREIGN PATENT DOCUMENTS

| | | | |
|---|---|---|---|
| JP | 2002240936 A | * | 8/2002 |
| JP | 2003-63632 A | | 3/2003 |
| JP | 2016-023038 A | | 2/2016 |
| JP | 2019-089623 A | | 6/2019 |
| JP | 2021-181347 A | | 11/2021 |
| WO | WO-2018/038171 A1 | | 3/2018 |

OTHER PUBLICATIONS

Extended European Search Report for European Application No. 23170575.7 mailed Oct. 25, 2023.

* cited by examiner

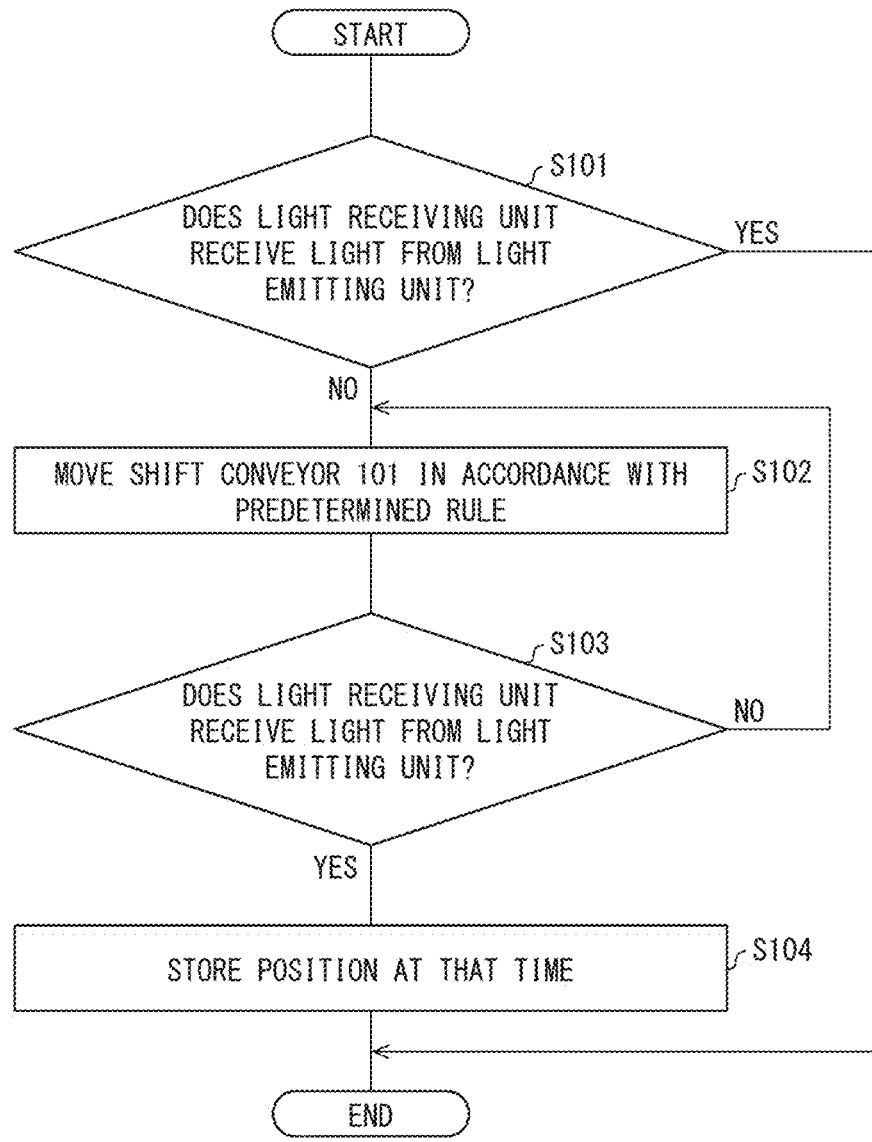

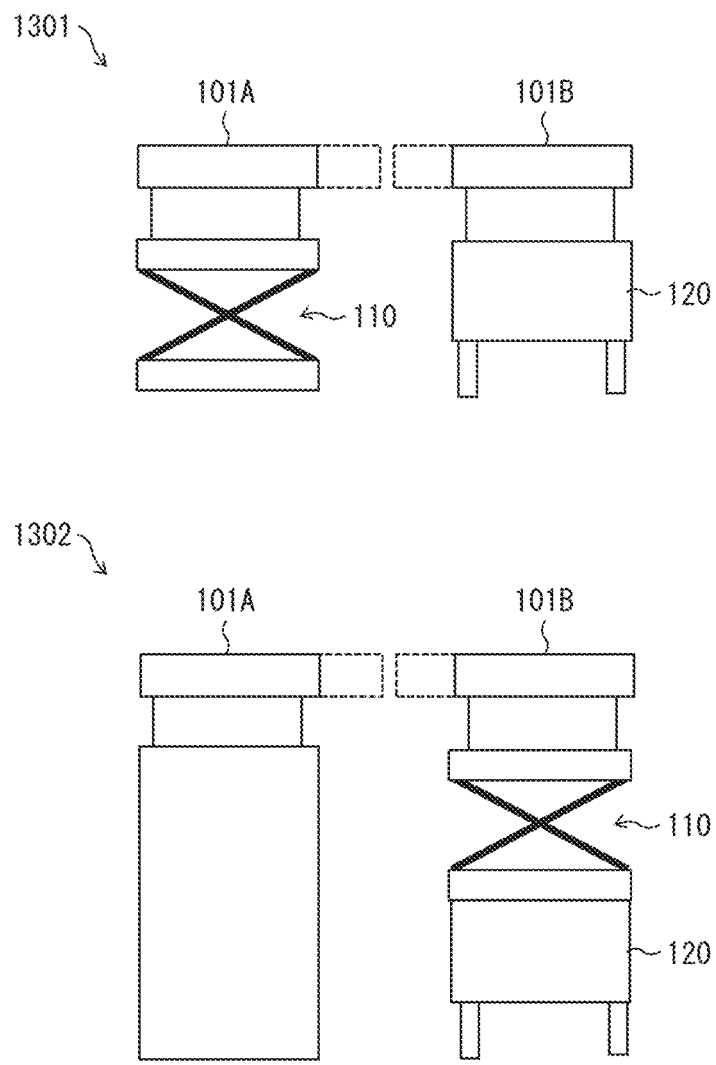

TRANSFER SYSTEM

This Nonprivisional application claims priority under 35 U.S.C. § 119 on Patent Application No. 2022-095912 filed in Japan on Jun. 14, 2022, the entire contents of which are hereby incorporated by reference.

TECHNICAL FIELD

The present invention relates to a transfer system for transferring an article between a seismically isolated structure and a seismically non-isolated structure.

BACKGROUND ART

Conventionally, to take measures against earthquakes, some automated warehouses provided with shelves for storing articles have been constructed to have the seismically isolated structure. However, constructing all the buildings to have the seismically isolated structure is not realistic and is not always beneficial, so that buildings having the seismically isolated structure and buildings having seismically non-isolated structure coexist in many cases. Further, some buildings may be constructed to have the seismically isolated structure not in entirety but in part. Specifically, a part of the floor of such a building may have the seismically isolated structure, and the remainder may have the seismically non-isolated structure. Thus, since a seismically isolated structure and a seismically non-isolated structure coexist in many cases, an article may be often transferred between such a seismically isolated structure and such a seismically non-isolated structure.

The seismically isolated structure and the seismically non-isolated structure may be different in, for example, how they are shaken by an earthquake and what states they have after the earthquake. In such a case, there may be caused some difficulties in transferring an article between the seismically isolated structure and the seismically non-isolated structure, such as a failure of a conveyor that serves for article transfer between the seismically isolated structure and the seismically non-isolated structure.

Patent Literature 1 discloses a conveyor device including a conveyor secured to extend between a seismically isolated structure and a seismically non-isolated structure, the conveyor device being capable of reducing damage by preventing the conveyor from being damaged as much as possible at the time of earthquake.

Patent Literature 2 discloses a floor body for use in a structure that includes a floor part having a seismically isolated structure and another floor part adjacent thereto having no seismically isolated structure, the floor body enabling a traveling body to travel between both the floor parts.

Patent Literature 3 discloses a power supply device that is hard to break and is capable of supplying, for example, electric power to a moving body even when one of a seismically isolated floor part and a seismically non-isolated floor part is displaced in a horizontal direction with respect to the other due to, for example, an earthquake.

Patent Literature 4 discloses a conveyor device capable of coping with a relative movement of a seismically isolated structure and a seismically non-isolated structure at the time of earthquake, to prevent a structural discontinuity from appearing in the middle of a transfer path extending in the article transfer direction, so as to prevent a failure in the transfer.

CITATION LIST

Patent Literature

Patent Literature 1

Japanese Patent Application Publication Tokukaihei No. 10-279040

Patent Literature 2

Japanese Patent Application Publication Tokukai No. 2001-63803

Patent Literature 3

Japanese Patent Application Publication Tokukai No. 2001-69656

Patent Literature 4

Japanese Patent Application Publication Tokukai No. 2003-63632

SUMMARY OF INVENTION

Technical Problem

However, these conventional art documents are silent about a case in which a seismically isolated structure and a seismically non-isolated structure have been misaligned due to, for example, an earthquake, resulting in misalignment of conveyors themselves for transferring articles between the seismically isolated structure and seismically non-isolated structure.

When conveyors for transferring articles between a seismically isolated structure and a seismically non-isolated structure have been misaligned, this makes it difficult to transfer articles between the two structures.

An aspect of the present invention has been made in view of such circumstances, and an object thereof is to provide a transfer system capable of transferring articles between buildings even when conveyors themselves have been misaligned.

Solution to Problem

To solve the problems described above, a transfer system in accordance with an aspect of the present invention is a transfer system for transferring an object to be transferred between separate buildings that include a first building and a second building separate from the first building, said transfer system including: a first conveyor provided in the first building; a second conveyor provided in the second building, the second conveyor being arranged in series with the first conveyor and being identical to the first conveyor in transfer direction, the second conveyor being capable of, during transfer, approaching the first conveyor in a mutually approaching manner and transferring an object to be transferred to and from the first conveyor; a vertical position adjustment mechanism configured to adjust relative vertical positions of the first conveyor and the second conveyor; and a horizontal position adjustment mechanism configured to adjust, in a horizontal plane, relative positions of the first conveyor and the second conveyor in a direction orthogonal to the transfer direction.

Advantageous Effects of Invention

According to an aspect of the present invention, it is possible to adjust the relative vertical positions and the relative horizontal positions of the first conveyor provided in the first building and the second conveyor provided in the second building. Thus, even when the first building and the second building have been misaligned due to, for example, an earthquake, it is possible to adjust relative positions of the first conveyor and the second conveyor, to allow transfer of the object to be transferred between the first and second conveyors.

BRIEF DESCRIPTION OF DRAWINGS

FIG. 12 is a flowchart illustrating a flow of an alignment method in the present embodiment.

FIG. 13 is a diagram illustrating a variation of the transfer system.

DESCRIPTION OF EMBODIMENTS

The following will describe in detail an embodiment of the present invention. A transfer system 100 in accordance with the present embodiment is configured to allow transfer of a transfer object P (object to be transferred) between a seismically isolated building 10 (first building) having a seismically isolated structure and a seismically non-isolated building 20 (second building) having a seismically non-isolated structure. The seismically isolated structure and the seismically non-isolated structure are different in, for example, how buildings having the respective structures are shaken by an earthquake, so that the states thereof after experiencing the earthquake may differ from each other. In particular, a building with the seismically isolated structure may be moved due to an earthquake. In such a case, the positional relationship between the seismically isolated building 10 and the seismically non-isolated building 20 changes due to the earthquake; this makes it difficult to transfer the transfer object P between the seismically isolated building 10 and the seismically non-isolated building 20. However, the transfer system 100 is configured to allow transfer of the transfer object P between the seismically isolated building 10 and the seismically non-isolated building 20 even when the positional relationship between the seismically isolated building 10 and the seismically non-isolated building 20 has thus changed. It should be noted that, for illustrative purposes, an example is employed in which the first building is a building having the seismically isolated structure and the second building is a building having the seismically non-isolated structure; however, the present invention is not limited thereto. Both the first and second buildings may have the seismically isolated structure, or alternatively, both the first and second buildings may have the seismically non-isolated structure. This is because separate buildings may be misaligned due to an earthquake regardless of whether the buildings has the seismically isolated structure.

Figure 1:
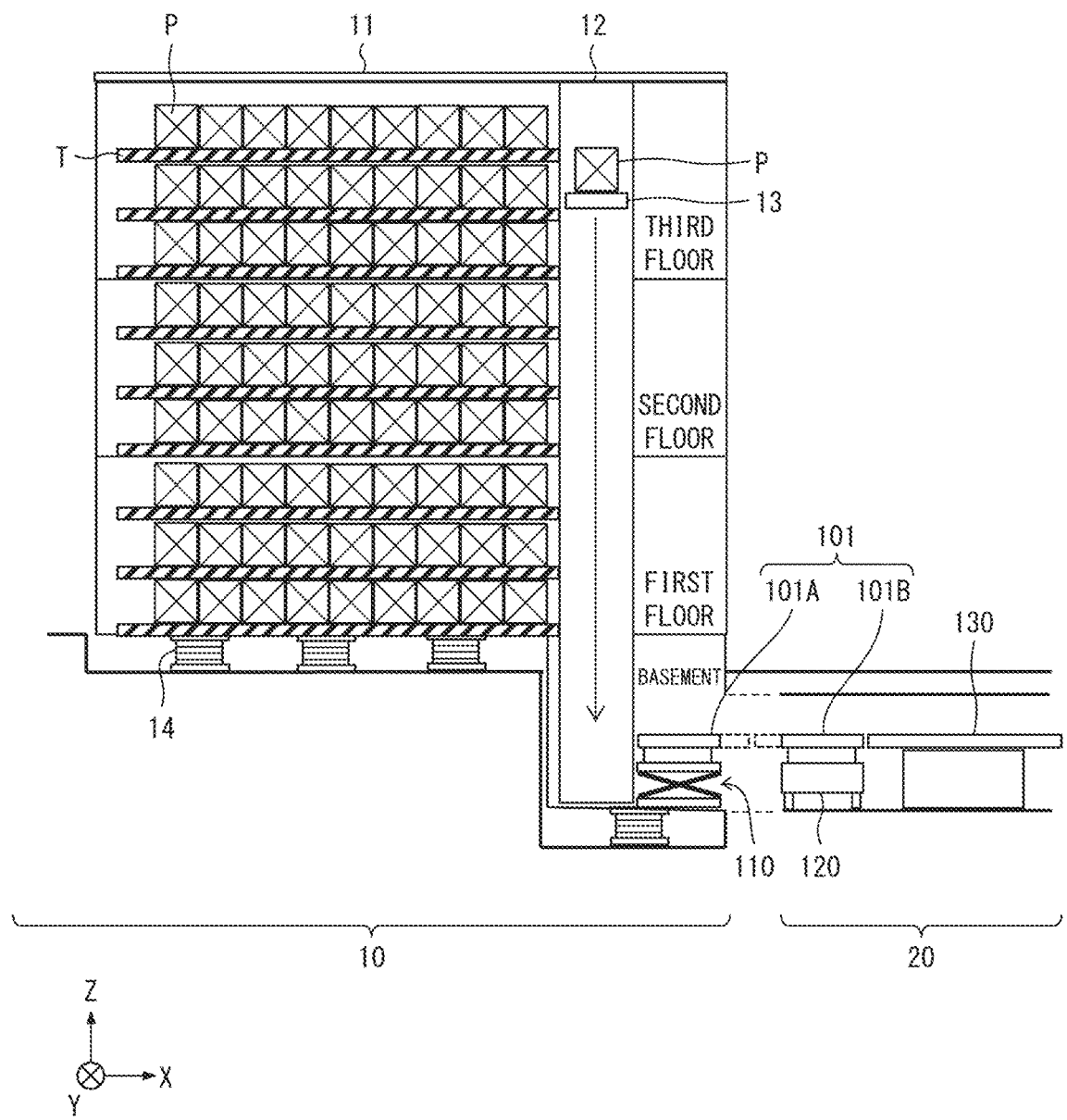
FIG. 1 is a side view of an example of buildings provided with a transfer system in accordance with an embodiment of the present invention.
Figure 2:
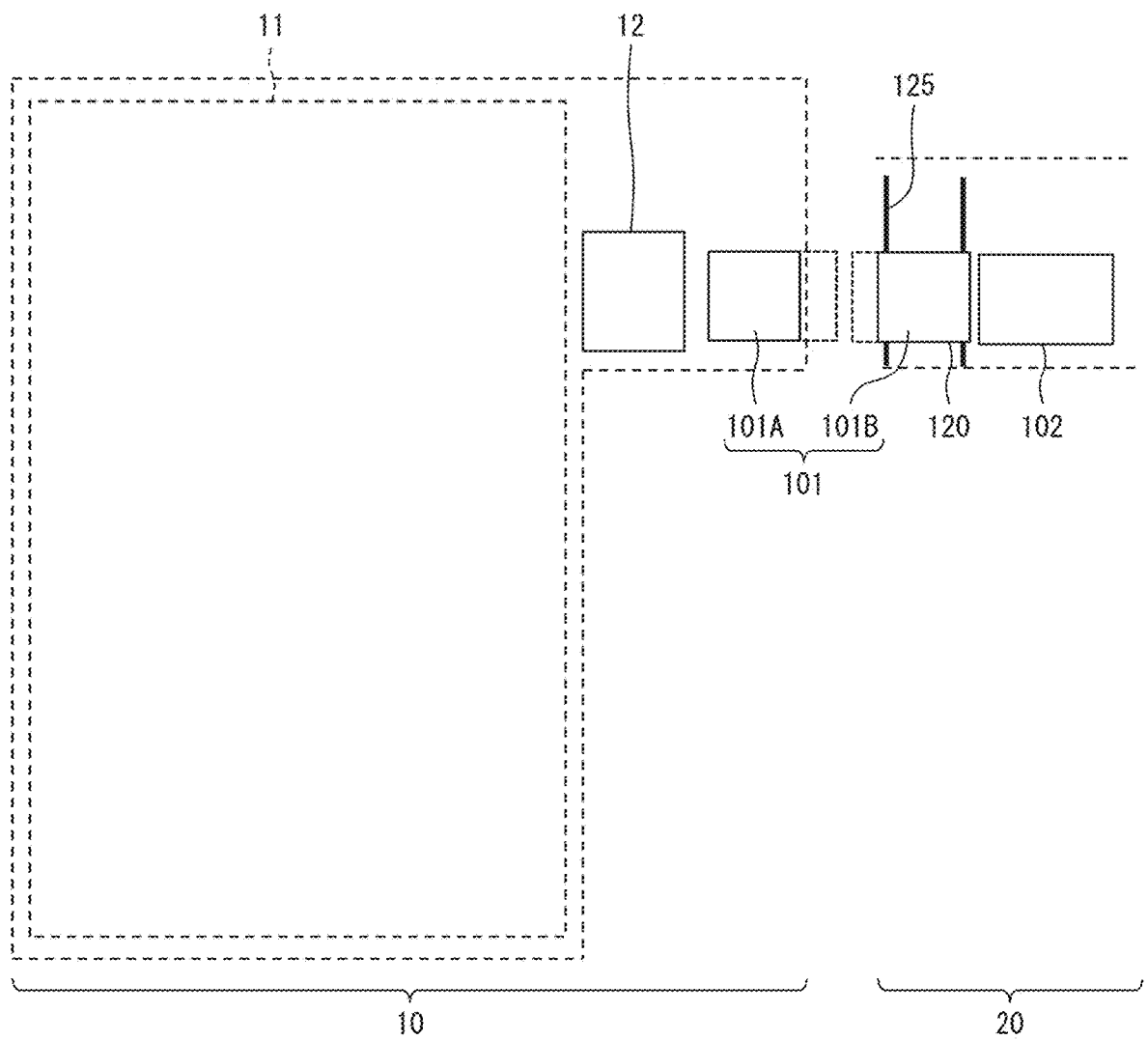
FIG. 2 is a plan view of the example of the buildings viewed from above (+Z direction).

First, an example of buildings provided with the transfer system 100 in accordance with the present embodiment will be described with reference to FIGS. 1 and 2. FIGS. 1 and 2 illustrate an example of the buildings provided with the transfer system 100. FIG. 1 is a side view and FIG. 2 is a plan view. It is herein assumed that a rightward direction in FIG. 1 is the +X direction, a direction from the near side to the far side in FIG. 1 is the +Y direction, and an upward direction in FIG. 1 is the +Z direction.

As illustrated in FIG. 1, according to the present embodiment, the buildings include a seismically isolated building 10 that includes a warehouse 11 and a seismically non-isolated building 20 that is connected underground to the seismically isolated building 10. The seismically isolated building 10 and the seismically non-isolated building 20 are adapted to transfer therebetween a transfer object P. The seismically isolated building 10 is a building having a seismically isolated structure, and the seismically non-isolated building 20 is a building having no seismically isolated structure. The seismically isolated structure of the seismically isolated building 10 is provided by disposing a seismically isolated device 14, such as a seismically isolating rubber, a damper, and rails, between the building and the ground.

The seismically isolated building 10 is a three-floor warehouse 11. In each floor, shelves T are installed, and on each shelf T, transfer objects P are stored. Each of the transfer objects P can be transferred, to the basement, from the floor on which the transfer object P is stored, by loading the transfer object P on a platform 13 of a vertical lift 12 and by moving the platform 13. Then, in the basement, the transfer object P is transferred to the seismically non-isolated building 20 by using the transfer system 100. In the seismically non-isolated building 20, the transfer object P is transferred from the transfer system 100 to a transfer conveyor 130. For example, the transfer may be performed by placing the transfer object P on a pallet (transfer board). The pallet may be a square plate with four sides of, for example, 1200 mm, or may have a basket-like shape. Further, a switch (second sensing section) configured to sense whether the transfer object P is placed on the pallet may be additionally provided.

It should be noted that although FIG. 1 depicts only the basement part of the seismically non-isolated building 20, the seismically non-isolated building 20 may include a building with aboveground floors rising up in the +X direction.

The transfer system 100 is configured to transfer the transfer object P between the seismically isolated building and the seismically non-isolated building 20. The transfer system 100 includes, on the side of the seismically isolated building 10, a shift conveyor 101A (first conveyor) and a table lifter 110 (vertical position adjustment mechanism). The transfer system 100 also includes, on the side of the seismically non-isolated building 20, a shift conveyor 101B (second conveyor) and a self-propelled vehicle 120 (horizontal position adjustment mechanism). The schematic configurations of the shift conveyors 101A and 101B, the table lifter 110, and the self-propelled vehicle 120 are as follows, and the details thereof will be described later. Between the seismically isolated building 10 and the seismically non-isolated building 20, a clearance (predetermined interval) of, for example, 800 mm is left. Further, the shift conveyor 101A and the shift conveyor 101B are arranged in series, and are capable of transferring the transfer object P in the same transfer direction. In addition, the shift conveyor 101A and the shift conveyor 101B are capable of shifting in directions facing each other. That is, the shift conveyor 101A is capable of shifting in the +X direction by 350 mm (first predetermined amount), and the shift conveyor 101B is capable of shifting in the –X direction by 350 mm (second predetermined amount). This configuration allows transfer of the transfer object P from the shift conveyor 101A to the shift conveyor 101B, and vice versa. Herein, when there is no need to distinguish between the shift conveyor 101A and the shift conveyor 101B, they may be simply referred to as the shift conveyors 101.

Further, FIG. 2 is a plan view of the seismically isolated building 10 and the seismically non-isolated building 20 when viewed from above, that is, when viewed in a direction from the +Z side to the –Z side. As illustrated in FIG. 2, the seismically non-isolated building 20 is provided with rails 125 on which the self-propelled vehicle 120 runs.

Figure 3:
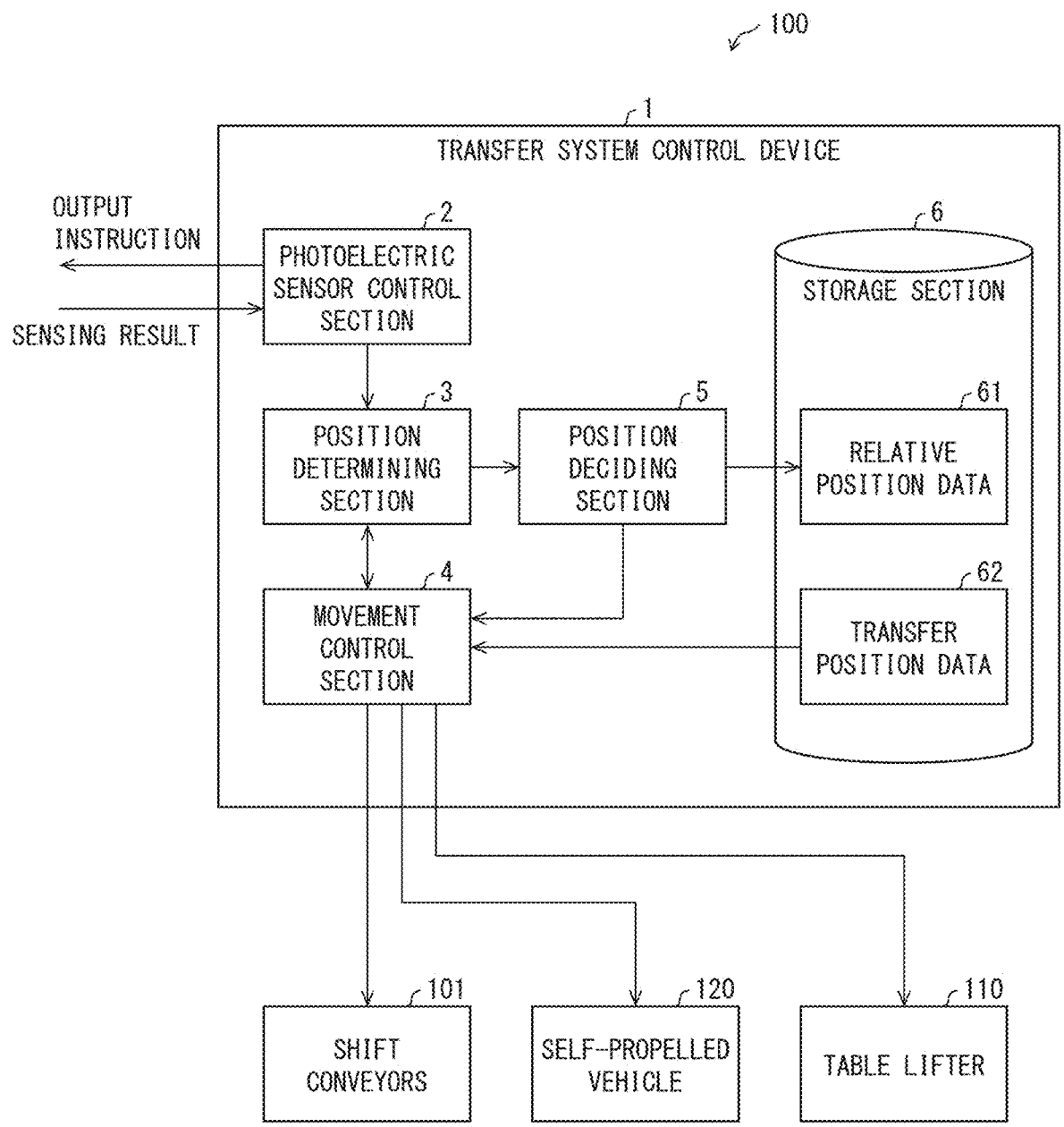
FIG. 3 is a functional block diagram illustrating a main part of the configuration of the transfer system in accordance with the present embodiment.

FIG. 3 is a functional block diagram illustrating a main part of the transfer system 100. As illustrated in FIG. 3, the transfer system 100 includes a transfer system control device 1, the shift conveyors 101, the table lifter 110, and the self-propelled vehicle 120.

The transfer system control device 1 is configured to control the shift conveyors 101, the table lifter 110, and the self-propelled vehicle 120, to allow transfer of the transfer object P between the seismically isolated building 10 and the seismically non-isolated building 20.

As illustrated in FIG. 3, the transfer system control device 1 includes a photoelectric sensor control section 2 (first sensing section), a position determining section 3 (adjusting section), a movement control section 4 (operating section), a position deciding section 5, and a storage section 6.

Figure 4:
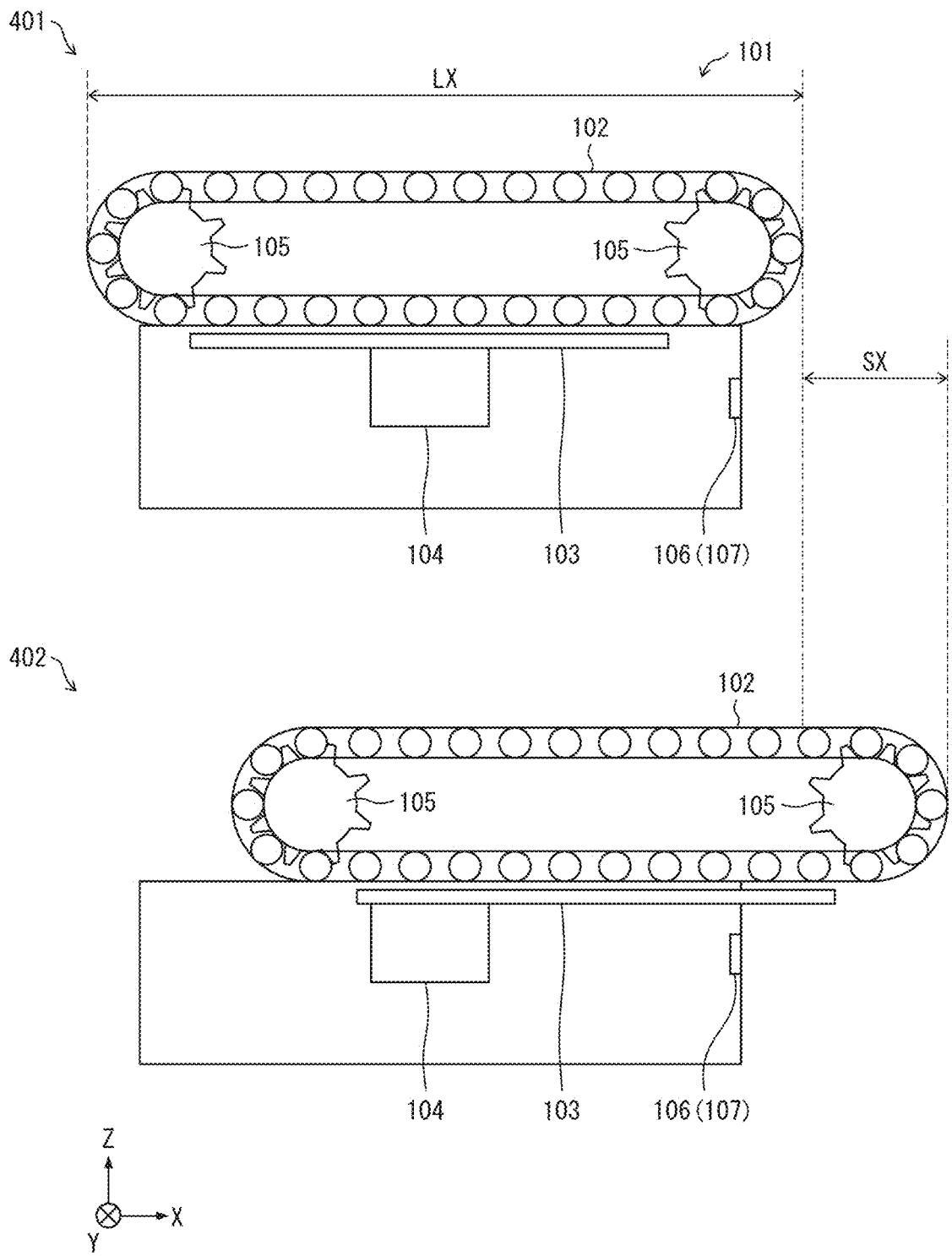
FIG. 4 is a diagram illustrating a shift conveyor included in the transfer system.
Figure 5:
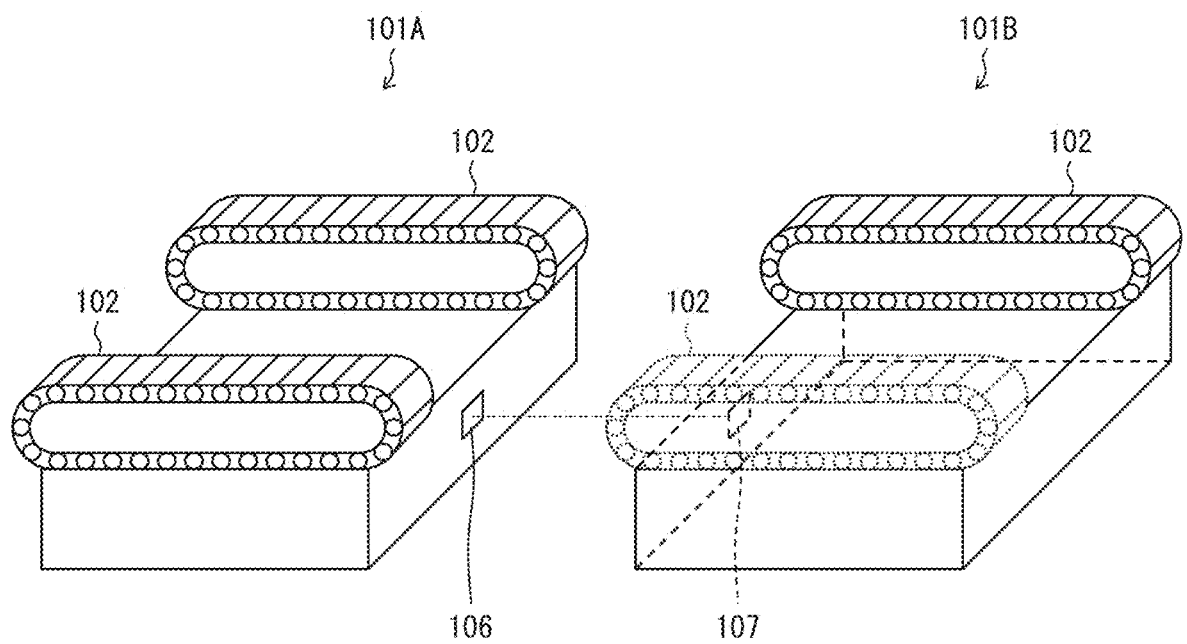
FIG. 5 is a diagram illustrating the positional relationship between a light emitting unit and a light receiving unit mounted on shift conveyors.

The photoelectric sensor control section 2 is configured to control a photoelectric sensor that includes a light emitting unit 106 (FIGS. 4 and 5) and a light receiving unit 107 (FIGS. 4 and 5). More specifically, the photoelectric sensor control section 2 causes the light emitting unit 106 mounted on the shift conveyor 101A to emit light, so as to detect whether the light receiving unit 107 mounted on the shift conveyor 101B receives the light. Although details will be described later, the light emitting unit 106 and the light receiving unit 107 are arranged at positions at which the light receiving unit 107 can receive light emitted from the light emitting unit 106 at the time when the shift conveyor 101A and the shift conveyor 101B are located at positions at which transfer of the transfer object P is allowed. Thus, sensing whether the light receiving unit 107 receives the light senses whether the shift conveyor 101A and the shift conveyor 101B are misaligned. Further, the light emitting unit 106 and the light receiving unit 107 may be lumped together as a photoelectric sensor.

Then, the photoelectric sensor control section 2 sends the sensing result to the position determining section 3. It should be noted that although a pair of the light emitting unit 106 and the light receiving unit 107 is illustrated herein, this is not limited thereto, and a plurality of pairs of the light emitting unit 106 and the light receiving unit 107 may be used.

The position determining section 3 obtains, from the photoelectric sensor control section 2, the sensing result indicating whether the light receiving unit 107 receives light emitted from the light emitting unit 106, and the position determining section 3 then determines whether the shift conveyor 101A and the shift conveyor 101B have the positional relationship that allows transfer of the transfer object P. Then, the result thus obtained is sent to the movement control section 4. The movement control section 4 is configured to change the positions of the shift conveyor 101A and the shift conveyor 101B, in accordance with the sent results. In other words, the position determining section 3 uses the sensing result obtained by the photoelectric sensor control section 2 to cause the movement control section 4 to operate the table lifter 110 and the self-propelled vehicle 120, to thereby adjust the positions of the shift conveyor 101A and the shift conveyor 101B to positions that allow transfer of the transfer object P between the shift conveyors 101A and 101B.

The movement control section 4 controls a shift of the shift conveyors 101, vertical movement of the table lifter 110, and movement of the self-propelled vehicle 120. More specifically, the movement control section 4 controls a shift amount of the shift conveyor 101A in the +X direction, that is, how much the shift conveyor 101A is shifted in the +X direction. The movement control section 4 also controls a shift amount of the shift conveyor 101B in the –X direction, that is, how much the shift conveyor 101B is shifted in the –X direction. Further, the movement control section 4 controls an amount of vertical movement of the table lifter 110, that is, how much the table lifter 110 is extended in the +Z direction and shortened in the –Z direction. Furthermore, the movement control section 4 controls an amount of horizontal movement of the self-propelled vehicle 120, that is, how much the self-propelled vehicle 120 is moved in the +Y direction and the –Y direction.

In the present embodiment, the shift amount of the shift conveyor 101A defines the position of the shift conveyor 101A in the X direction, and the shift amount of the shift conveyor 101B defines the position of the shift conveyor 101B in the X direction. The amount of movement of the table lifter 110 defines the vertical position of the shift conveyor 101A, that is, the position in the Z direction. The amount of movement of the self-propelled vehicle 120 defines the transverse position of the shift conveyor 101B, that is, the position in the Y direction.

The position deciding section 5 decides that the positions of the shift conveyors 101A and 101B at the time when the position determining section 3 determines that the shift conveyors 101A and 101B have the positional relationship that allows transfer of the transfer object P are transferable positions of the transfer object P. Then, the position deciding section 5 stores, in the storage section 6, information indicating the positions at that time, as relative position data 61. That is, the position deciding section 5 decides that the positions defined by the shift amount of the shift conveyor 101A, the shift amount of the shift conveyor 101B, the vertical position of the shift conveyor 101A altered by the table lifter 110, and the transversal position of the shift conveyor 101B altered by the self-propelled vehicle 120, at the time when the position determining section 3 determines that the shift conveyors 101A and 101B have the positional relationship that allows transfer of the transfer object P, are transferable positions of the transfer object P, and then, the position deciding section 5 stores, in the storage section 6, information indicating the positions at that time, as relative position data 61.

The storage section 6 is a storage section that stores information indicating the positions of the shift conveyors 101, such as the relative position data 61 and transfer position data 62. As mentioned above, the relative position data 61 is information indicating the positions of the shift conveyors 101A and 101B that allow transfer of the transfer object P between the shift conveyor 101A and the shift conveyor 101B. The transfer position data 62 is information indicating the position of the shift conveyor 101A that allows transfer of the transfer object P to and from the vertical lift 12, and information indicating the position of the shift conveyor 101B that allows transfer of the transfer object P to and from the transfer conveyor 130.

The shift conveyor 101 is a conveyor for transferring the transfer object P, and may be, for example, a chain conveyor. The conveyor has a length of, for example, 1700 mm. FIGS. 4 and 5 depict an example of a shift conveyor 101. FIG. 4 is a diagram illustrating the side view of the shift conveyor 101. Herein, the shift conveyor 101A is depicted. It should be noted that the shift conveyor 101B is identical to the shift conveyor 101A, but is different in that (i) the shift direction thereof is opposite to that of the shift conveyor 101A, that is, the shift direction is the −X direction, and (ii) the light receiving unit 107 is mounted instead of the light emitting unit 106.

FIG. 4 illustrates, in 401, a state in which the shift amount of the shift conveyor 101 is zero, and illustrates, in 402, a state in which the shift amount of the shift conveyor 101 is SX.

As illustrated in FIG. 4, the shift conveyor 101 includes a chain 102, a conveyor mount 103, and a shift motor 104. The chain 102 is a conveyor, and has, for example, a total length of 1700 mm. The chain 102 is placed on the conveyor mount 103. Thus, when the shift motor 104 moves the conveyor mount 103 in the X direction, the chain 102 is moved in the X direction. With this configuration, it is possible to shift the shift conveyor 101 in the X direction. The shift amount SX may be a fixed value or may be any value set as appropriate. In a case of the fixed value, the shift amount SX may be, for example, 350 mm.

Each of the light emitting unit 106 and the light receiving unit 107 is mounted on one shift conveyor 101 beneath the chain 102 at the front part in the shift direction on a face that faces the other shift conveyor 101 facing said one shift conveyor 101. Specifically, the light emitting unit 106 is mounted on the shift conveyor 101A, and the light receiving unit 107 is mounted on the shift conveyor 101B. It should be noted that the light emitting unit 106 may be mounted on the shift conveyor 101B, and the light receiving unit 107 may be mounted on the shift conveyor 101A.

FIG. 5 illustrates the positional relationship between the light emitting unit 106 mounted on the shift conveyor 101A and the light receiving unit 107 mounted on the shift conveyor 101B. As illustrated in FIG. 5, the light emitting unit 106 and the light receiving unit 107 are situated at positions facing each other. In addition, the light emitting unit 106 and the light receiving unit 107 are situated at positions at which the light receiving unit 107 can receive light emitted from the light emitting unit 106 at the time when the shift conveyor 101A and the shift conveyor 101B are located at positions at which transfer of the transfer object P between the shift conveyors 101A and 101B is allowed.

In this way, the light receiving unit 107 can receive light emitted from the light emitting unit 106 when the shift conveyors 101A and 101B are located at positions at which transfer of the transfer object P between the shift conveyors 101A and 101B is allowed.

Figure 6:
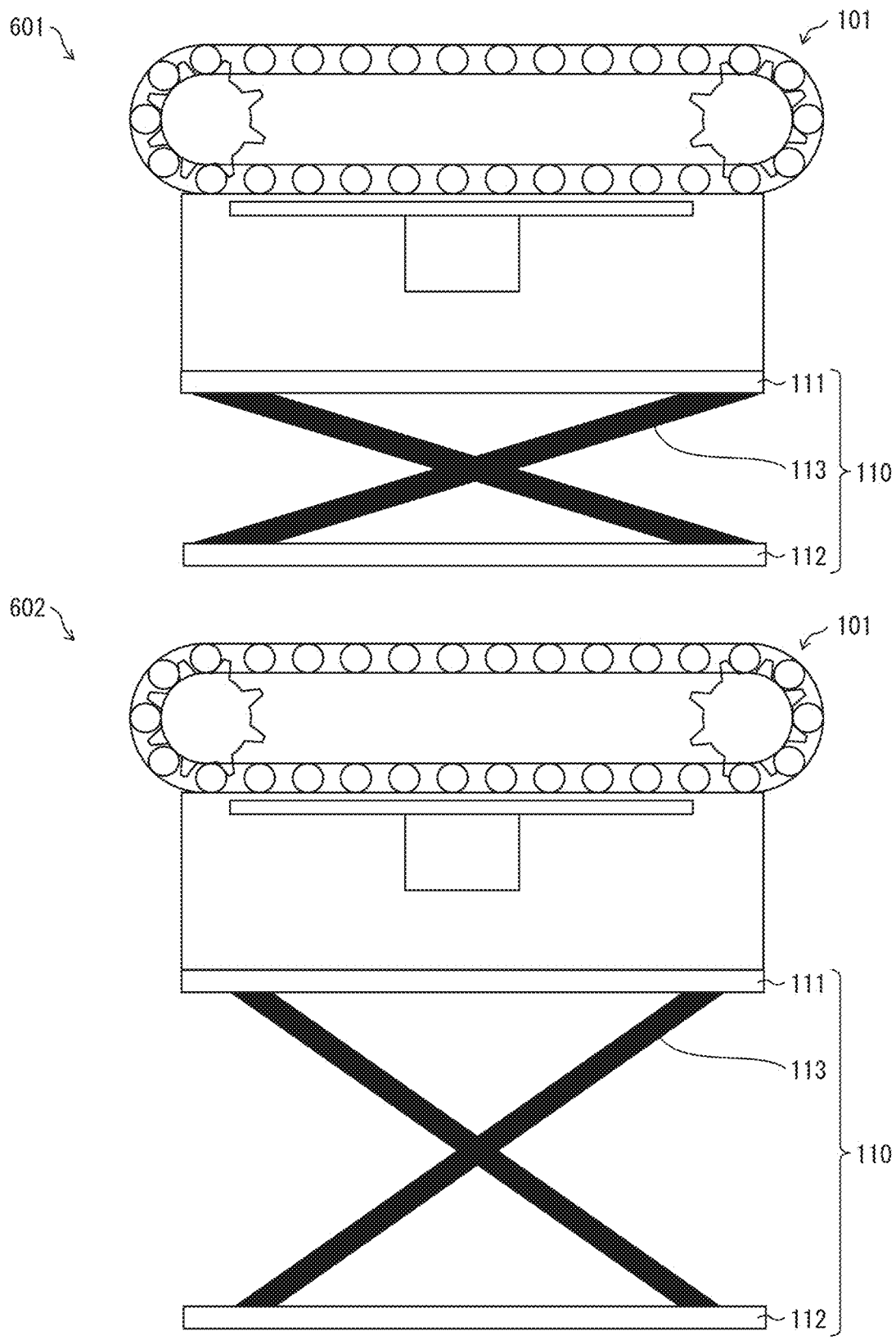
FIG. 6 is a diagram illustrating a shift conveyor and a table lifter included in the transfer system.

FIG. 6 illustrates a configuration in which a shift conveyor 101 is placed on the table lifter 110. As illustrated in FIG. 6, the table lifter 110 includes a table 111, a lower frame 112, and an arm 113. In the table lifter 110, changing the angle of the arm 113 makes the height of the table 111 variable relative to the lower frame 112. That is, the table lifter 110 is capable of adjusting the relative vertical positions of the shift conveyors 101A and 101B.

In addition, by placing the shift conveyor 101 on the table 111 of the table lifter 110, the height of the shift conveyor 101, that is, the position in the Z direction can be changed.

Figure 7:
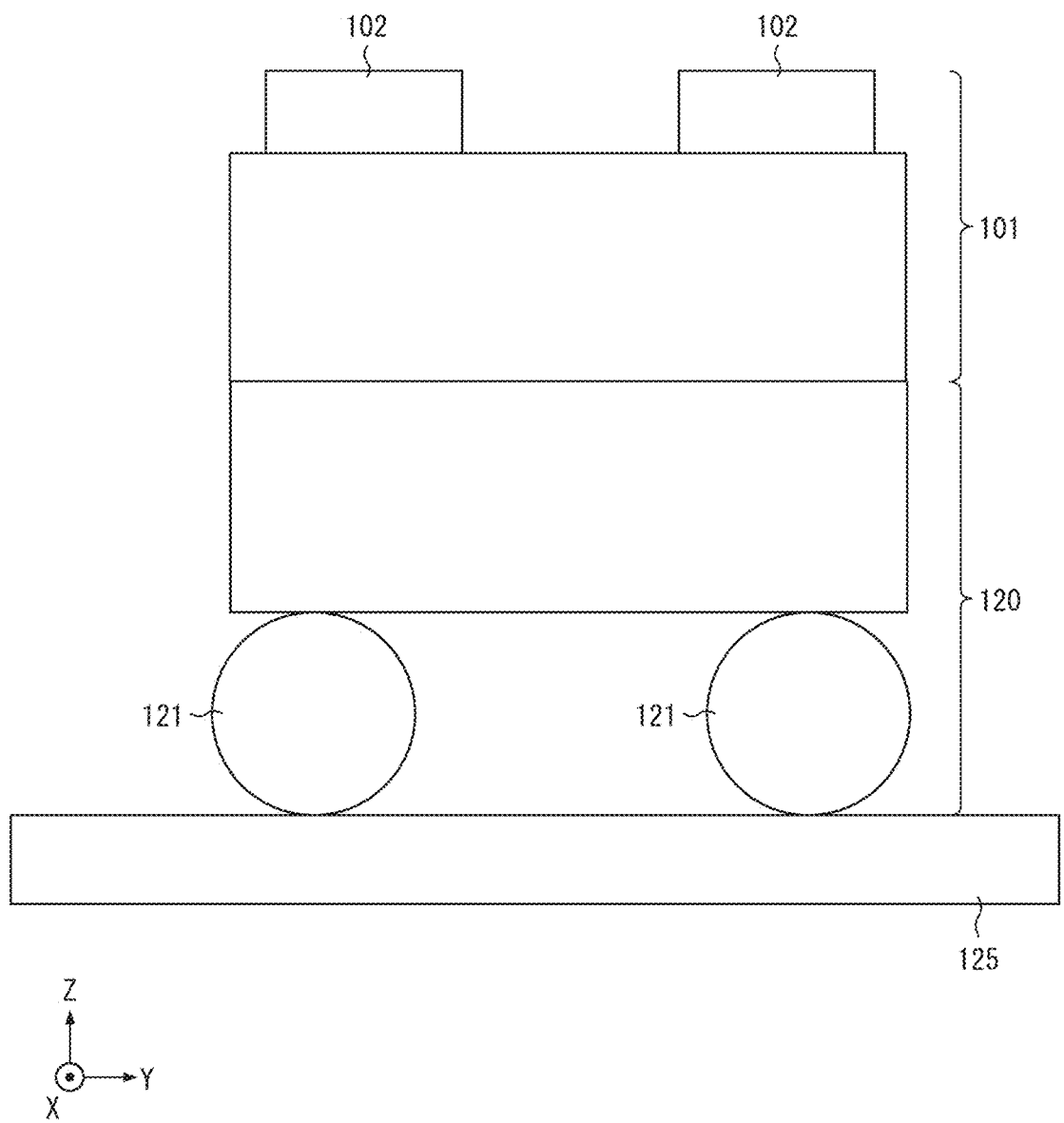
FIG. 7 is a diagram illustrating a shift conveyor and a self-propelled vehicle included in the transfer system.
Figure 8:
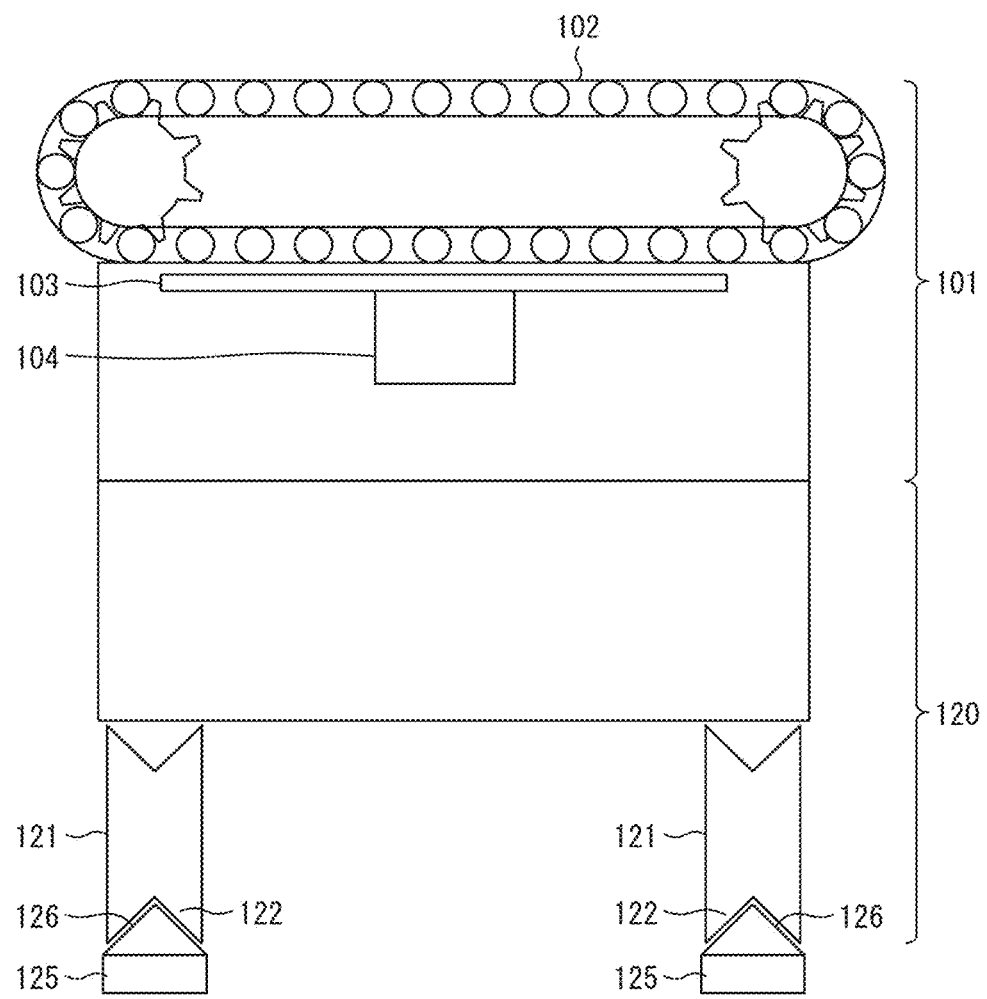
FIG. 8 is a diagram illustrating the shift conveyor and the self-propelled vehicle included in the transfer system.
Figure 9:
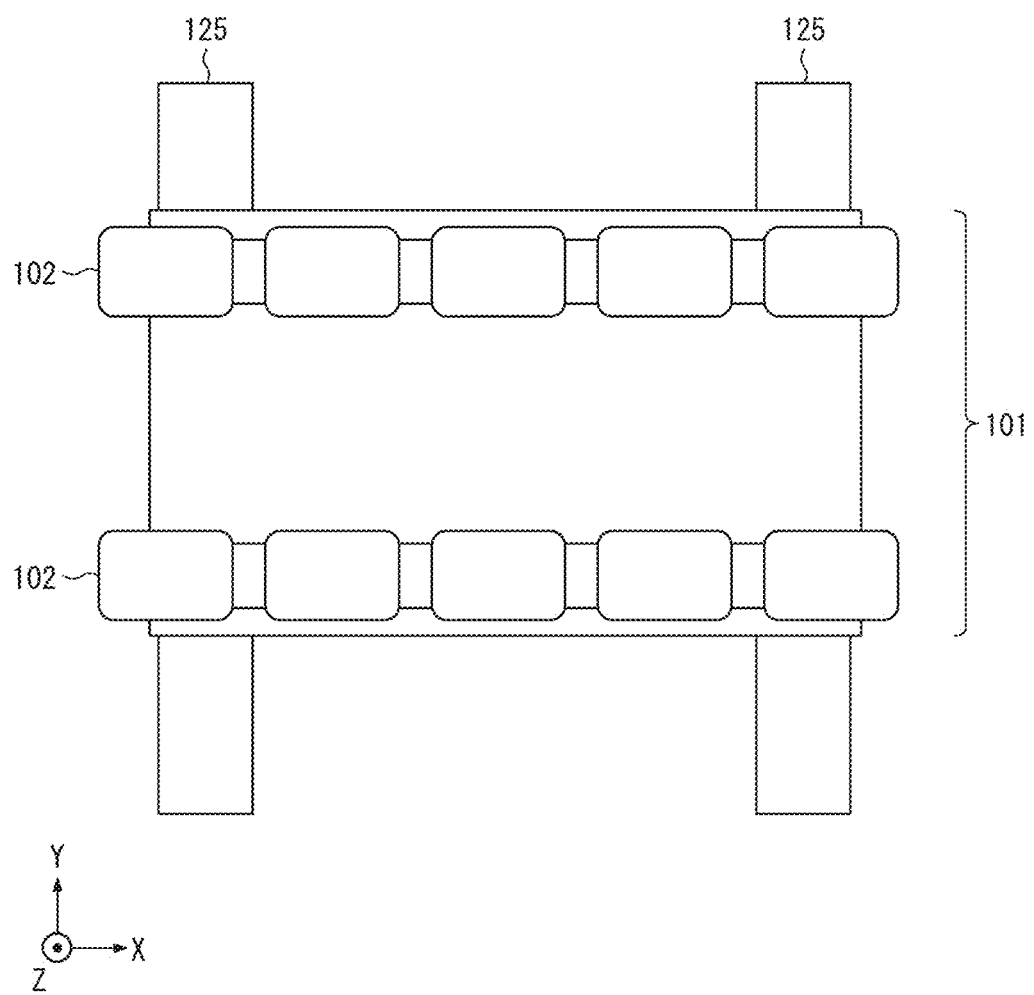
FIG. 9 is a diagram illustrating the shift conveyor and the self-propelled vehicle included in the transfer system.

Each of FIGS. 7 to 9 illustrates a configuration in which a shift conveyor 101 is placed on the self-propelled vehicle 120. FIG. 7 is a diagram illustrating a state in which the shift conveyor 101 is placed on the self-propelled vehicle 120, when viewed in the X direction. FIG. 8 is a diagram illustrating the state when viewed in the Y direction. FIG. 9 is a diagram illustrating the state when viewed in the Z direction.

As illustrated in FIG. 7, the self-propelled vehicle 120 is provided with wheels 121 on the lower portion thereof. As the wheels 121 are configured to run on the rails 125, this enables the self-propelled vehicle 120 to move.

Further, as illustrated in FIG. 8, each rail 125 has a cross-sectional shape having a projection 126 that projects in the +Z direction. Each wheel 121 has a depression 122 when viewed in cross-section perpendicular to the rotation direction of the wheel 121. As each wheel 121 is configured to rotate with the depression 122 fitted on the projection 126, this prevents the wheels 121 from coming off the rails 125.

Further, as illustrated in FIG. 9, the rails 125 extend in the Z direction, so that the self-propelled vehicle 120 and the shift conveyor 101 placed on the self-propelled vehicle 120 are configured to be capable of moving in the Z direction. That is, the self-propelled vehicle 120 is capable of adjusting, in the horizontal plane, the relative positions of the shift conveyors 101A and 101B in a direction orthogonal to the transfer direction.

It should be noted that the self-propelled vehicle 120 may be provided with an anti-lift member to prevent the self-propelled vehicle 120 from lifting up to one side while the shift conveyor 101B is shifted.

As described in the foregoing, the transfer system 100 in accordance with the present embodiment is configured to transfer a transfer object P between the seismically isolated building 10 and the seismically non-isolated building 20, which are separate buildings. The transfer system 100 includes: the shift conveyor 101A provided in the seismically isolated building 10; and the shift conveyor 101B provided in the seismically non-isolated building 20. The shift conveyor 101B is arranged in series with the shift conveyor 101A, and is identical to the shift conveyor 101A in transfer direction. The shift conveyor 101B is capable of, during transfer, approaching the shift conveyor 101A in a mutually approaching manner and transferring a transfer object P to and from the shift conveyor 101A. In addition, the transfer system 100 includes: the table lifter 110 configured to adjust the relative vertical positions of the shift conveyors 101A and 101B; and the self-propelled vehicle 120 configured to adjust, in the horizontal plane, the relative positions of the shift conveyors 101A and 101B in a direction orthogonal to the transfer direction.

Further, the table lifter 110 is combined with one of the shift conveyor 101A and the shift conveyor 101B, and the self-propelled vehicle 120 is combined with the other of the shift conveyor 101A and the shift conveyor 101B.

[Method of Adjusting Position of Shift Conveyor 101]

Figure 10:
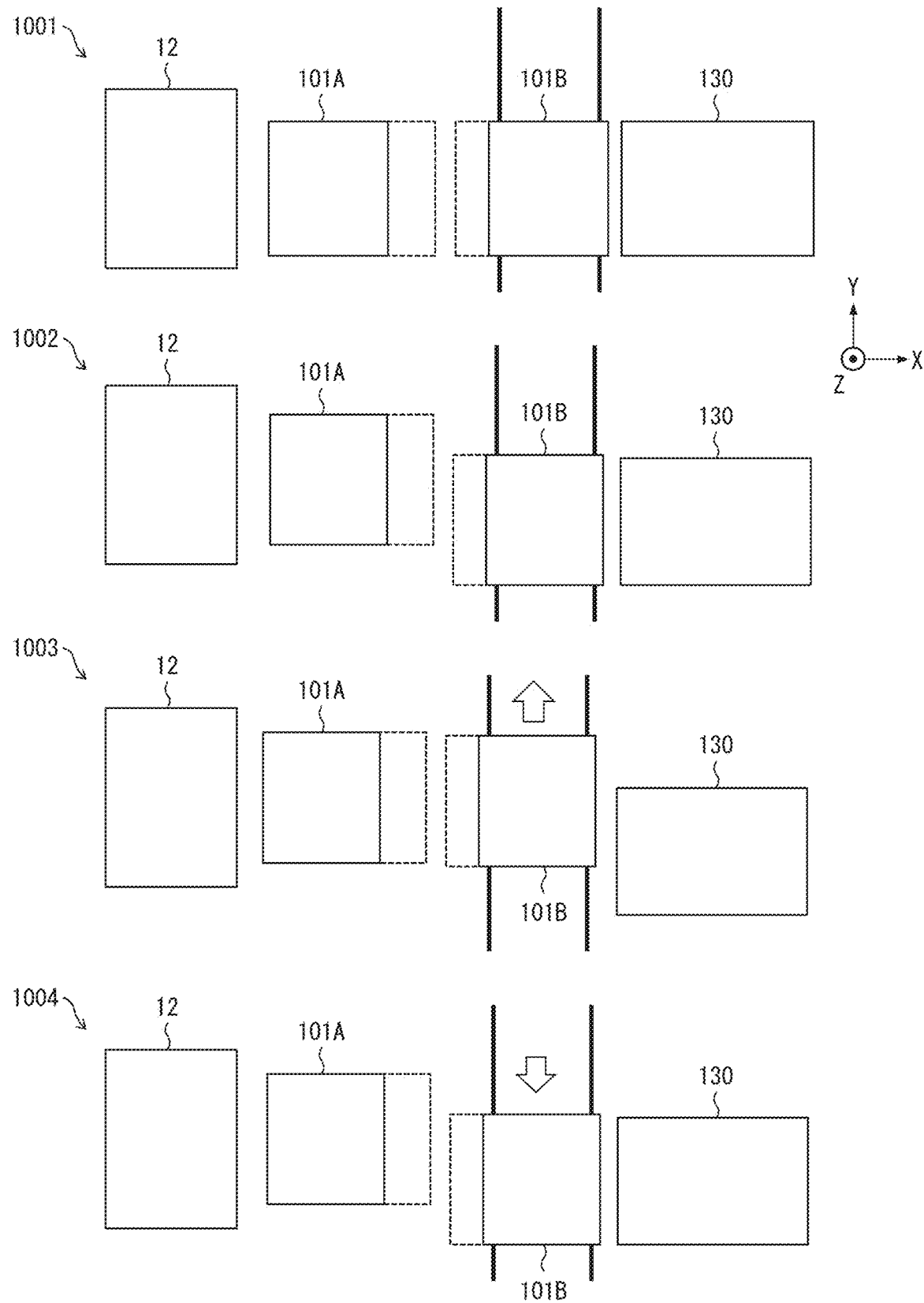
FIG. 10 is a diagram for explaining an alignment method for use in a case of misalignment in the Y-direction.

Next, a method of adjusting the positions of the shift conveyors 101 will be described with reference to FIGS. 10 and 11. FIG. 10 illustrates a method of adjusting a position when the positional relationship between the shift conveyor 101A and the shift conveyor 101B is changed in the Y direction.

Referring to 1001 of FIG. 10, as usual, there is no misalignment in the Y direction between the shift conveyor 101A and the shift conveyor 101B, so that the transfer object P can be transferred. Thus, the transfer object P is transferred from the vertical lift 12 to the shift conveyor 101A, then from the shift conveyor 101A to the shift conveyor 101B, and then from the shift conveyor 101B to the transfer conveyor 130. Or the transfer object P is transferred in inverse order.

In a case in which an earthquake happens and it causes the seismically isolated building 10 to move in the Y direction, the situation may be as illustrated in 1002 of FIG. 10. Referring to 1002 of FIG. 10, the shift conveyor 101A has been displaced in the +Y direction with respect to the shift conveyor 101B.

In this situation, the shift conveyor 101B is moved on the self-propelled vehicle 120 in the +Y direction by an amount of displacement, as illustrated in 1003 of FIG. 10, to allow transfer of the transfer object P between the shift conveyor 101A and the shift conveyor 101B. Then, when the transfer of the transfer object P from the shift conveyor 101A to the shift conveyor 101B is completed, the shift conveyor 101B is moved to return to the original position, as illustrated in 1004 of FIG. 10, to allow transfer to the transfer conveyor 130. This allows transfer of the transfer object P from the shift conveyor 101B to the transfer conveyor 130.

Figure 11:
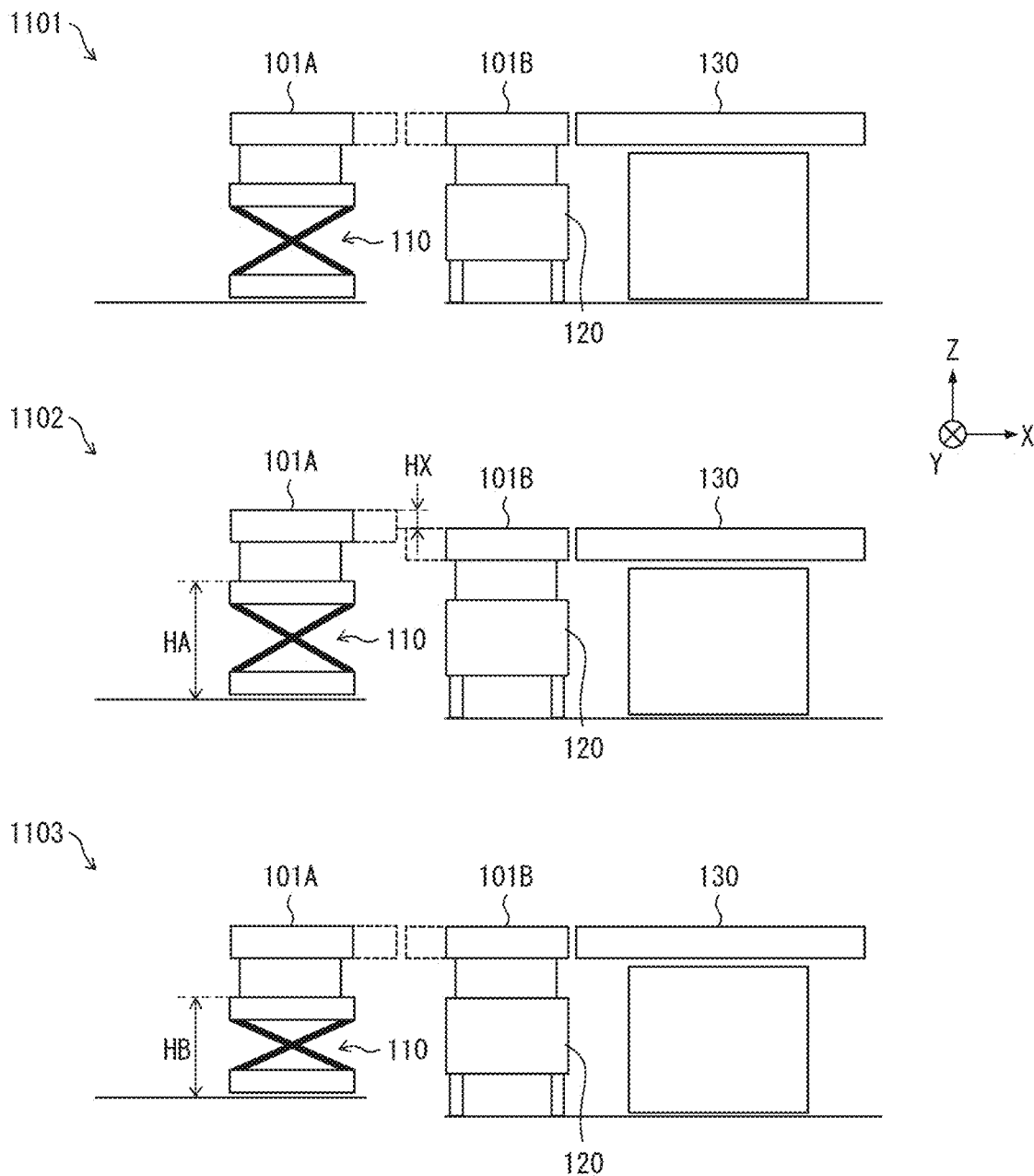
FIG. 11 is a diagram for explaining an alignment method for use in a case of misalignment in the Z-direction.

FIG. 11 illustrates a method of adjusting positions when the positional relationship between the shift conveyor 101A and the shift conveyor 101B is changed in the Z direction.

Referring to 1101 of FIG. 11, as usual, there is no misalignment in the Z direction between the shift conveyor 101A and the shift conveyor 101B, so that the transfer object P can be transferred. Thus, the transfer object P is transferred from the vertical lift 12 to the shift conveyor 101A, then from the shift conveyor 101A to the shift conveyor 101B, and then from the shift conveyor 101B to the transfer conveyor 130. Or the transfer object P is transferred in inverse order, that is, from the transfer conveyor 130 to the shift conveyor 101B, then from the shift conveyor 101B to the shift conveyor 101A, and then from the shift conveyor 101A to the vertical lift 12.

In a case in which an earthquake happens and it causes the seismically isolated building 10 to move in the Z direction, the situation may be as illustrated in 1102 of FIG. 11. Referring to 1102 of FIG. 11, the shift conveyor 101A has been displaced in the +Z direction with respect to the shift conveyor 101B.

In this situation, the shift conveyor 101A is moved on the table lifter 110 in the −Z direction by an amount of displacement, as illustrated in 1103 of FIG. 11, to allow transfer of the transfer object P between the shift conveyor 101A and the shift conveyor 101B. This allows transfer of the transfer object P from the shift conveyor 101A to the shift conveyor 101B, and then to the transfer conveyor 130.

Further, in a case in which both the seismically isolated building 10 and the seismically non-isolated building 20 have been moved in both the Y direction and the Z direction, that is, both the shift conveyor 101A and the shift conveyor 101B have been displaced in both the Y direction and the Z direction, movement in the Y direction by means of the self-propelled vehicle 120 and movement in the Z direction by means of the table lifter 110 may be combined to allow transfer of the transfer object P between the shift conveyor 101A and the shift conveyor 101B.

Furthermore, in the foregoing embodiment, the self-propelled vehicle 120 is used to achieve the movement in the Y direction of the shift conveyor 101B, but this is not limited thereto. The shift conveyor 101B may be configured to be bendable to achieve the movement in the Y direction.

[Flow of Alignment Process]

Next, referring to FIG. 12, a process in which the transfer system control device 1 adjusts the positions of the shift conveyor 101A and the shift conveyor 101B will be described. FIG. 12 is a flowchart illustrating the flow of the process of adjusting the positions of the shift conveyors 101A and 101B.

First, the position determining section 3 determines whether the shift conveyor 101A and the shift conveyor 101B have a positional relationship that allows transfer of the transfer object P (hereinafter, referred to as the "aligned position"), based on whether the light receiving unit 107 receives light emitted from the light emitting unit 106 (S101). If the shift conveyor 101A and the shift conveyor 101B are in the aligned position ("YES" in S101), the process is terminated.

On the other hand, if the shift conveyor 101A and the shift conveyor 101B are not in the aligned position ("NO" in S101), the movement control section 4 controls the table lifter 110 and the self-propelled vehicle 120 to change the positions of the shift conveyors 101A and 101B in accordance with a predetermined rule (S102). Herein, the predetermined rule includes instructions in which directions of movement and amounts of movement are determined in advance. For example, according to the predetermined rule, first, a position of a shift conveyor 101 is changed in the Y direction by a predetermined amount (e.g., 5 mm), while the position is fixed in the Z direction. Then, the process proceeds to step S103. When the process returns to step S102, the position at that time is changed in the Y direction by the predetermined amount, while the position is fixed in the Z direction, as in the last time. This is repeated every time the process returns to step S102. If the position cannot be changed any more in the Y direction, the position at that time are then changed in the Z direction by a predetermined amount (e.g., 5 mm), and the resultant position is then changed in the Y direction by the predetermined amount while the position is fixed in the Z direction. Then, every time the process returns to step S102, the operation is repeated to change the position in the Y direction by the predetermined amount. This operation is repeated until the position cannot be changed any more in the Z direction.

After the shift conveyor 101 is moved in step S102, the position determining section 3 determines whether the shift conveyor 101A and the shift conveyor 101B are in the aligned position based on whether the light receiving unit 107 receives light emitted from the light emitting unit 106 (S103).

That is, the position determining section 3 performs feedback control to control the movement control section 4, to make the shift conveyor 101A and the shift conveyor 101B moved to the aligned position. In other words, the position determining section 3 repeats the following steps (1) and (2), to adjust the positions of the shift conveyors 101A and 101B to positions at which transfer of the transfer object P between the shift conveyors 101A and 101B is allowed: (1) causing the movement control section 4 to operate at least one selected from the group consisting of the table lifter 110 and the self-propelled vehicle 120 so that the at least one selected from the group consisting of the table lifter 110 and the self-propelled vehicle 120 moves, by a predetermined amount, at least one selected from the group consisting of the shift conveyor 101A and the shift conveyor 101B, and (2) obtaining a sensing result obtained by the photoelectric sensor control section 2 every time the at least one selected from the group consisting of the shift conveyor 101A and the shift conveyor 101B is moved.

If the shift conveyor 101A and the shift conveyor 101B are not in the aligned position ("NO" in S103), the process returns to step S102. On the other hand, if the shift conveyor 101A and the shift conveyor 101B are in the aligned position ("YES" in S103), the transfer object P can be transferred between the shift conveyors 101A and 101B at the positions at that time. Then, the position deciding section 5 stores the positions at that time in the storage section 6 as a transferable position (S104).

The foregoing is the flow of the process carried out in the transfer system control device 1.

It should be noted that the abovementioned method of adjusting the positions of the shift conveyor 101A and the shift conveyor 101B is merely an example, and this is not limited thereto. The position may be fixed in the Y direction, and may be changed in the Z direction by a predetermined amount at a time to perform the adjustment. Alternatively, the position may be changed in both the Y direction and the Z direction by a predetermined amount at a time to perform the adjustment.

Further, the seismically isolated building 10 may gradually return to the original position after being moved due to the earthquake. Thus, the alignment process may be performed any time, and the storage section 6 always stores the latest position data of the relative position data 61.

[Variation]

Described in the foregoing embodiment is an example in which the shift conveyor 101A is combined with the table lifter 110, and the shift conveyor 101B is combined with the self-propelled vehicle 120 (1301 of FIG. 13).

The transfer system 100 is not limited thereto. For example, as illustrated in 1302 of FIG. 13, the shift conveyor 101B may be combined with both the table lifter 110 and the self-propelled vehicle 120. Either the shift conveyor 101A or the shift conveyor 101B may be combined with both the table lifter 110 and the self-propelled vehicle 120, and whichever is selected to be combined, it is possible to move the selected one in both the Y direction and the Z direction. Thus, it is possible to achieve advantageous effects similar to those achieved by the embodiment described above.

Software Implementation Example

The functions of the transfer system control device 1 (hereinafter, referred to as the "device") can be realized by a program for causing a computer to function as the device, the program causing the computer to function as each control block (the photoelectric sensor control section 2, the position determining section 3, the movement control section 4, and the position deciding section 5) of the device.

In this case, the device includes, as hardware for executing the program, a computer which includes at least one control device (e.g., processor) and at least one storage device (e.g., memory). Each function described in the foregoing embodiments can be realized by executing the program by the control device and the storage device.

The program may be stored in one or more non-transitory storage mediums each of which can be read by the computer. This storage medium may or may not be provided in the above device. In the latter case, the program can be supplied to or made available to the device via any transmission medium such as a wired transmission medium or a wireless transmission medium.

Further, some or all of functions of respective control blocks can be realized by a logic circuit. For example, the present invention encompasses, in its scope, an integrated circuit in which a logic circuit that functions as each of the above-described control blocks. As another alternative, for example, it is possible to realize the functions of respective control blocks by a quantum computer.

Further, each of processes which are described in the foregoing embodiments can be executed by artificial intelligence (AI). In this case, the AI may be operated by the control device, or alternatively operated by another device (e.g., an edge computer, a cloud server, etc.).

Aspects of the present invention can also be expressed as follows:

A transfer system in accordance with Aspect 1 of the present invention is a transfer system for transferring an object to be transferred between separate buildings that include a first building and a second building separate from the first building, said transfer system including: a first conveyor provided in the first building; a second conveyor provided in the second building, the second conveyor being arranged in series with the first conveyor and being identical to the first conveyor in transfer direction, the second conveyor being capable of, during transfer, approaching the first conveyor in a mutually approaching manner and transferring an object to be transferred to and from the first conveyor; a vertical position adjustment mechanism configured to adjust relative vertical positions of the first conveyor and the second conveyor; and a horizontal position adjustment mechanism configured to adjust, in a horizontal plane, relative positions of the first conveyor and the second conveyor in a direction orthogonal to the transfer direction.

With this configuration, it is possible to adjust the relative vertical positions and the relative horizontal positions of the first conveyor, which is provided in the first building, and the second conveyor, which is provided in the second building. Thus, even when the first building and the second building have been misaligned due to, for example, an earthquake, it is possible to adjust the relative positions of the first conveyor and the second conveyor, to allow transfer of the object to be transferred between the first and second conveyors.

A transfer system in accordance with Aspect 2 of the present invention is configured so that, in addition to Aspect 1, the transfer system includes: an operating section configured to operate the vertical position adjustment mechanism and the horizontal position adjustment mechanism; a first sensing section configured to sense whether there is a misalignment between the first conveyor and the second conveyor to obtain a sensing result; and an adjusting section configured to adjust positions of the first conveyor and the second conveyor to positions at which transfer of the object to be transferred between the first and second conveyors is allowed, based on the sensing result obtained by the first sensing section, while causing the operating section to operate the vertical position adjustment mechanism and the horizontal position adjustment mechanism.

With this configuration, it is possible to automatically adjust the positions of the first conveyor and the second conveyor, to allow transfer of the object to be transferred between the first conveyor and the second conveyor.

A transfer system in accordance with Aspect 3 of the present invention is configured so that, in addition to Aspect 1 or 2, the adjusting section carries out the adjustment by repeating the following (1) and (2): (1) causing the operating section to operate at least one selected from the group consisting of the vertical position adjustment mechanism and the horizontal position adjustment mechanism so that the at least one selected from the group consisting of the vertical position adjustment mechanism and the horizontal position adjustment mechanism moves, by a predetermined amount, at least one selected from the group consisting of the first conveyor and the second conveyor; and (2) obtaining the sensing result obtained by the first sensing section every time the at least one selected from the group consisting of the first conveyor and the second conveyor is moved.

With this configuration, it is possible to reliably perform adjustment of the positions of the first conveyor and the second conveyor to positions at which transfer of the object to be transferred is allowed.

A transfer system in accordance with Aspect 4 of the present invention is configured so that, in addition to any one of Aspects 1 to 3, a predetermined clearance is left between the first conveyor and the second conveyor, the first conveyor is a shift conveyor capable of moving by a first predetermined amount in a direction toward the second conveyor, and the second conveyor is a shift conveyor capable of moving by a second predetermined amount in a direction toward the first conveyor.

With this configuration, even when the clearance is left between the first conveyor and the second conveyor, it is possible to transfer the object to be transferred between the first conveyor and the second conveyor. Further, even when the positional relationship between the first conveyor and the second conveyor is changed in the transfer direction due to, for example, an earthquake, it is possible to transfer the object to be transferred by adjusting the first predetermined amount and the second predetermined amount.

A transfer system in accordance with Aspect 5 of the present invention is configured so that, in addition to any one of Aspects 1 to 4, the vertical position adjustment mechanism is combined with one of the first conveyor and the second conveyor, and the horizontal position adjustment mechanism is combined with the other of the first conveyor and the second conveyor.

With this configuration, the vertical position adjustment mechanism and the horizontal position adjustment mechanism are combined with separate conveyors, so that it is possible to avoid an unnecessarily increase in dimensions of the entirety of the transfer system.

A transfer system in accordance with Aspect 6 of the present invention is configured so that, in addition to any one of Aspects 1 to 5, combined with the vertical position adjustment mechanism and the horizontal position adjustment mechanism is either one of the first conveyor and the second conveyor.

With this configuration, since only one of the conveyors is combined with the vertical position adjustment mechanism and the horizontal position adjustment mechanism, it is possible to easily control the adjustment of position.

A transfer system in accordance with Aspect 7 of the present invention is configured so that, in addition to Aspect 2, the first sensing section is a photoelectric sensor including: a light emitting unit mounted on one of the first conveyor and the second conveyor; and a light receiving unit mounted on the other of the first conveyor and the second conveyor.

With this configuration, it is possible to appropriately sense whether the positions of the first conveyor and the second conveyor are in positions at which transfer of the object to be transferred is allowed.

A transfer system in accordance with Aspect 8 of the present invention is configured so that, in addition to any one of Aspects 1 to 7, the object to be transferred is placed on a transfer board and is transferred by means of the first conveyor and the second conveyor, and said transfer system further includes a second sensing section configured to sense whether the object to be transferred is placed on the transfer board.

With this configuration, it is possible to sense whether the object to be transferred is placed on the transfer board.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 Transfer system control device
2 Photoelectric sensor control section (first sensing section)
3 Position determining section (adjusting section)
4 Movement control section (operating section)
5 Position deciding section
6 Storage section
10 Seismically isolated building (first building)
11 Warehouse
12 Vertical lift
13 Platform
14 Seismically isolated device
20 Seismically non-isolated building (second building)
100 Transfer system
101 Shift conveyors
101A Shift conveyor (first conveyor)
101B Shift conveyor (second conveyor)
102 Chain
103 Conveyor mount
104 Shift motor
105 Sprockets
110 Table lifter (vertical position adjustment mechanism)
120 Self-propelled vehicle (horizontal position adjustment mechanism)
121 Wheels
125 Rails
130 Transfer conveyor
P Transfer object (object to be transferred)
T Shelves

The invention claimed is:
1. A transfer system for transferring an object to be transferred between separate buildings that include a first building and a second building separate from the first building, said transfer system comprising:
a first conveyor provided in the first building;

a second conveyor provided in the second building, the second conveyor being arranged in series with the first conveyor and being identical to the first conveyor in transfer direction, the second conveyor being capable of, during transfer, approaching the first conveyor in a mutually approaching manner and transferring an object to be transferred to and from the first conveyor;

a vertical position adjustment mechanism configured to adjust relative vertical positions of the first conveyor and the second conveyor;

a horizontal position adjustment mechanism configured to adjust, in a horizontal plane, relative positions of the first conveyor and the second conveyor in a direction orthogonal to the transfer direction;

an operating section configured to operate the vertical position adjustment mechanism and the horizontal position adjustment mechanism;

a first sensing section configured to sense whether there is a misalignment between the first conveyor and the second conveyor to obtain a sensing result; and an adjusting section configured to adjust positions of the first conveyor and the second conveyor to positions at which transfer of the object to be transferred between the first and second conveyors is allowed, based on the sensing result obtained by the first sensing section, while causing the operating section to operate the vertical position adjustment mechanism and the horizontal position adjustment mechanism.

2. The transfer system according to claim 1, wherein the adjusting section carries out the adjustment by repeating the following (1) and (2):

(1) causing the operating section to operate at least one selected from the group consisting of the vertical position adjustment mechanism and the horizontal position adjustment mechanism so that the at least one selected from the group consisting of the vertical position adjustment mechanism and the horizontal position adjustment mechanism moves, by a predetermined amount, at least one selected from the group consisting of the first conveyor and the second conveyor; and (2) obtaining the sensing result obtained by the first sensing section every time the at least one selected from the group consisting of the first conveyor and the second conveyor is moved.

3. The transfer system according to claim 1, wherein a predetermined clearance is left between the first conveyor and the second conveyor, the first conveyor is a shift conveyor capable of moving by a first predetermined amount in a direction toward the second conveyor, and the second conveyor is a shift conveyor capable of moving by a second predetermined amount in a direction toward the first conveyor.

4. The transfer system according to claim 1, wherein the vertical position adjustment mechanism is combined with one of the first conveyor and the second conveyor, and the horizontal position adjustment mechanism is combined with the other of the first conveyor and the second conveyor.

5. The transfer system according to claim 1, wherein combined with the vertical position adjustment mechanism and the horizontal position adjustment mechanism is either one of the first conveyor and the second conveyor.

6. The transfer system according to claim 1 wherein the first sensing section is a photoelectric sensor comprising: a light emitting unit mounted on one of the first conveyor and the second conveyor; and a light receiving unit mounted on the other of the first conveyor and the second conveyor.

7. The transfer system according to claim 1, wherein the object to be transferred is placed on a transfer board and is transferred by means of the first conveyor and the second conveyor, and said transfer system further comprises a second sensing section configured to sense whether the object to be transferred is placed on the transfer board.

8. A transfer system for transferring an object to be transferred between separate buildings that include a first building and a second building separate from the first building, said transfer system comprising:

a first conveyor provided in the first building;

a second conveyor provided in the second building, the second conveyor being arranged in series with the first conveyor and being identical to the first conveyor in transfer direction, the second conveyor being capable of, during transfer, approaching the first conveyor in a mutually approaching manner and transferring an object to be transferred to and from the first conveyor;

a vertical position adjustment mechanism configured to adjust relative vertical positions of the first conveyor and the second conveyor; and a horizontal position adjustment mechanism configured to adjust, in a horizontal plane, relative positions of the first conveyor and the second conveyor in a direction orthogonal to the transfer direction, wherein the vertical position adjustment mechanism is combined with one of the first conveyor and the second conveyor, and the horizontal position adjustment mechanism is combined with the other of the first conveyor and the second conveyor.

9. A transfer system for transferring an object to be transferred between separate buildings that include a first building and a second building separate from the first building, said transfer system comprising:

a first conveyor provided in the first building;

a second conveyor provided in the second building, the second conveyor being arranged in series with the first conveyor and being identical to the first conveyor in transfer direction, the second conveyor being capable of, during transfer, approaching the first conveyor in a mutually approaching manner and transferring an object to be transferred to and from the first conveyor;

a vertical position adjustment mechanism configured to adjust relative vertical positions of the first conveyor and the second conveyor; and a horizontal position adjustment mechanism configured to adjust, in a horizontal plane, relative positions of the first conveyor and the second conveyor in a direction orthogonal to the transfer direction, wherein the object to be transferred is placed on a transfer board and is transferred by means of the first conveyor and the second conveyor, and said transfer system further comprises a second sensing section configured to sense whether the object to be transferred is placed on the transfer board.

* * * * *